(12) United States Patent
Münch et al.

(10) Patent No.: US 10,239,582 B2
(45) Date of Patent: Mar. 26, 2019

(54) DEVICE AND METHOD FOR AUTOMATICALLY SHIFTING A GEARSHIFT MECHANISM OF A BICYCLE

(71) Applicant: Schaeffler Technologies AG & Co. KG, Herzogenaurach (DE)

(72) Inventors: Dagmar Münch, Fürth (DE); Matthias Herbrich, Fürth (DE); Fabian Kempe, Emskirchen (DE); Ralf Weippert, Bergrheinfeld (DE); Thomas Drescher, Wachenroth (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 8 days.

(21) Appl. No.: 15/562,003

(22) PCT Filed: Feb. 3, 2016

(86) PCT No.: PCT/DE2016/200069
§ 371 (c)(1),
(2) Date: Sep. 27, 2017

(87) PCT Pub. No.: WO2016/155714
PCT Pub. Date: Oct. 6, 2016

(65) Prior Publication Data
US 2018/0105230 A1   Apr. 19, 2018

(30) Foreign Application Priority Data

Apr. 2, 2015   (DE) .................. 10 2015 206 037

(51) Int. Cl.
*B62M 25/08*   (2006.01)
*B62M 6/45*   (2010.01)
(Continued)

(52) U.S. Cl.
CPC .............. *B62M 25/08* (2013.01); *B62M 6/45* (2013.01); *B62M 9/123* (2013.01); *B62M 9/133* (2013.01);
(Continued)

(58) Field of Classification Search
None
See application file for complete search history.

(56) References Cited

U.S. PATENT DOCUMENTS 6,047,230 A * 4/2000 Spencer ................. B62M 9/123
  474/70
9,234,580 B1 * 1/2016 Usui ...................... B62M 25/08
(Continued)

FOREIGN PATENT DOCUMENTS

DE   19528133 A1   1/1997
EP   1384659 A2    1/2004
(Continued)

*Primary Examiner* — Dirk Wright
(74) *Attorney, Agent, or Firm* — Kevin L. Parks

(57) ABSTRACT

An automatic shifting device for a bicycle is disclosed. The device may include a shifting actuator to activate the gearshift mechanism, a computing unit connected to the shifting actuator, an operator control/display unit connected to the computing unit, an inclination angle sensor, and a velocity sensor. The operator control/display unit may receive a first input value of a gear speed of the gearshift mechanism for starting on a level underlying surface; a second input value of a velocity of the bicycle at which shifting into a maximum gear speed of the gearshift mechanism takes place on a level underlying surface; and a third input value of a velocity of the bicycle at which shifting into a maximum gear speed for this terrain inclination takes place on an underlying surface with a positive terrain inclination. An individualized shifting algorithm based on the input values may be stored in the computing unit.

10 Claims, 3 Drawing Sheets

(51) Int. Cl.
*B62M 9/123* (2010.01)
*B62M 9/133* (2010.01)
*B62J 99/00* (2009.01)
*B62M 25/00* (2006.01)

(52) U.S. Cl.
CPC . *B62J 2099/0026* (2013.01); *B62M 2025/003* (2013.01)

(56) References Cited

U.S. PATENT DOCUMENTS

| | | | |
|---|---|---|---|
| 9,302,737 B2* | 4/2016 | Kuroda | B62M 25/04 |
| 9,975,603 B2* | 5/2018 | Bortolozzo | B62M 25/08 |
| 10,086,906 B2* | 10/2018 | Baumann | B62M 25/08 |
| 2002/0094906 A1 | 7/2002 | Jordan | |
| 2007/0213150 A1 | 9/2007 | Chattin | |
| 2016/0375957 A1* | 12/2016 | Hashimoto | B62M 9/122 |
| | | | 474/70 |

FOREIGN PATENT DOCUMENTS

| | | | |
|---|---|---|---|
| EP | 1527990 A2 | 5/2005 |
| EP | 1595777 A2 | 11/2005 |
| EP | 2377713 A1 | 10/2011 |

* cited by examiner

DEVICE AND METHOD FOR AUTOMATICALLY SHIFTING A GEARSHIFT MECHANISM OF A BICYCLE

CROSS-REFERENCE TO RELATED APPLICATIONS

This application is the U.S. National Phase of PCT Appln. No. PCT/DE2016/200069 filed Feb. 3, 2016, which claims priority to DE 102015206037.3 filed Apr. 2, 2015, the entire disclosures of which are incorporated by reference herein.

TECHNICAL FIELD

The disclosure relates to devices and methods for automatically shifting a gearshift mechanism of a bicycle, for example, an electric bicycle.

BACKGROUND

Some devices and methods for automatically shifting a gearshift mechanism of a bicycle are already known.

DE 195 28 133 A1 discloses a device for load-dependent and speed-dependent automatic shifting of bicycle gearshifts. In this context, various items of electrical information such as a velocity, a pedaling force or a pedaling torque, a positive gradient or inclination of the underlying surface and a pedaling speed or pedaling frequency are transmitted to a control computer which is mounted on the bicycle handlebars. This information is acquired by means of electrical sensors mounted on the bicycle, wherein, inter alia, an inclination sensor is present. An instantaneous load situation is calculated in the control computer, the gear mechanism transmission ratio which is best adapted to this load situation is acquired, and as a result the corresponding gear speed is applied automatically on the bicycle. The control computer has here a display unit for displaying the velocity, the riding distance, the riding time and the currently engaged gear speed. In order to provide the rider of the bicycle with the possibility of influencing the gear mechanism transmission ratio provided to them and to permit manual adaptation of the automatically set gear mechanism transmission ratio as a function of its current physique and performance, an information encoder in the form of a shifting unit is present on the handlebars of the bicycle. The rider of the bicycle can intervene directly in the control by means of this shifting unit and can select between a "low", "normal" or "high" transmission ratio or load curve. Furthermore, "freezing" of the currently selected gear speed can take place in order to suppress any undesired gear speed changes. The control computer transmits the shifting signals to at least one server actuator which automatically activates the gearshift.

EP 2377713 A1 describes an electric bicycle in which the required auxiliary drive force of the electric motor is acquired and activated automatically, inter alia as a function of the terrain inclination.

However, it has become apparent that riders of bicycles do not find such predetermined possibilities for influencing the shifting process to be sufficiently comfortable and desire, owing to their specific physique and performance, a setting of the shifting algorithm which is further diversified and individualized to a high degree.

SUMMARY

One object of the disclosure is therefore to make available a device and a method for automatically shifting a gearshift mechanism of a bicycle with which more individual adaptation of the shifting strategy to the personal requirements of the respective rider of the bicycle is made possible.

The device for automatically shifting a gearshift mechanism of a bicycle, in particular of an electric bicycle, may comprise at least one shifting actuator for automatically activating the gearshift mechanism, at least one computing unit which is connected to the at least one shifting actuator, an operator control and display unit which is connected to the at least one computing unit, at least one inclination angle sensor for detecting a current terrain inclination and at least one further sensor for detecting a current velocity of the bicycle, wherein the at least one inclination angle sensor and the at least one further sensor are connected to the at least one computing unit, in that the operator control and display unit:

makes available a first input apparatus for inputting a first input value $E1$ in the form of a gear speed of the gearshift mechanism for starting on a level underlying surface, makes available a second input apparatus for inputting a second input value $E2$ in the form of a velocity of the bicycle, at which shifting into a maximum gear speed of the gearshift mechanism takes place on a level underlying surface;

has a third input apparatus for inputting a third input value $E3$ in the form of a further velocity of the bicycle, at which shifting into a maximum or optimum gear speed for this terrain inclination takes place on an underlying surface with a positive terrain inclination; and wherein a shifting algorithm which can be individualized on the basis of the first, second, and third input values is stored in the at least one computing unit.

The device permits the inputting of individual input values for influencing a shifting strategy for automatically shifting the gearshift mechanism of a bicycle. A device is present which permits individual shifting strategies which can be adapted to the physique and performance of the individual rider of the bicycle and is particularly close to the optimum shifting strategy which the rider of the bicycle would select in the case of manual setting of the gearshift mechanism. As a result, the need to influence the shifting strategy during travel may be reduced and the riding safety and the riding comfort may be significantly increased.

The shifting actuator may be formed here by a linear shifting actuator. The latter may have a particularly narrow and elongate design so that its integration into the frame of a bicycle and its electrical connection to the computing unit are possible without difficulty.

The at least one computing unit may be arranged integrated into the operator control and display unit, but can alternatively also be provided in the frame of the bicycle.

At least the second input apparatus and/or at least the third input apparatus may be formed by a slide controller. However, the first input apparatus can also be made available by means of a slide controller. This makes it possible for the rider of the bicycle to input quickly and in an uncomplicated way the input values which individualize the shifting strategy, if said inputting is actually also necessary during travel.

The operator control and display unit may make available a graphic simulation of a slide controller. This may be beneficial when a mobile device with a touchscreen, such as a smartphone, is used as the operator control and display unit, wherein the input apparatuses are made available by means of a mobile application, and the input values are interrogated by means of this mobile application. The rider of the bicycle may input the input values which he desires, on the basis of which input values the shifting algorithm which is stored in the at least one computing unit is modified and individualized.

It has proven valuable here if the operator control and display unit is also configured to display to the rider of the bicycle selected current riding data such as the velocity, the terrain inclination, the distance traveled, the travel time, the travel route, if appropriate together with instructions about the direction of travel, such as in a navigation device, the engaged gear speed etc. In order to satisfy a navigation function, a GPS unit may be integrated into the operator control and display unit.

The at least one computing unit may be configured to define, with the aid of the first input value E1, the second input E2 value and the third input value E3, a plane in a three-dimensional coordinate system with the coordinates x, y and z, wherein the x coordinate corresponds to a velocity, wherein the y coordinate corresponds to a gear speed of the gearshift mechanism, and wherein the z coordinate corresponds to a terrain inclination. In this context, the shifting algorithm which may be stored in the computing unit, can be individualized on the basis of the defined plane, and in the at least one computing unit is configured to output a shifting signal for shifting the gearshift mechanism into another gear speed to the at least one shifting actuator (3) if a current riding state, which is determined by the current velocity, a currently selected gear speed (n) of the gearshift mechanism and the current terrain inclination is in the defined plane or approaches the defined plane.

The plane may be calculated from the three input values E1, E2, E3, wherein, in particular, a Hesse normal form of the plane equation is selected. The plane equation may be used as a basis for the individualized shifting strategy in the at least one computing unit.

The position of individual shifting points during the shifting through from the first to the highest gear speed may take place on the basis of a straight line between the starting point at a starting speed of 0 km/h and a riding point with a speed v, at which shifting into the highest gear speed takes place, by virtue of the fact that the shifting points may be arranged distributed equidistantly on the straight line. However, a non-equidistant distribution of the shifting points can also be selected. This permits an individual shifting strategy which is adapted further to the individual rider of the bicycle.

A use of a device according to the disclosure for automatically shifting a gearshift mechanism of a bicycle, in particular of an electric bicycle, has proven valuable. The electric bicycle may be formed here by a pedelec or an e-bike. A pedelec (=pedal electric cycle) is a type of electric bicycle in which an electric drive assists the rider of the bicycle during pedaling. An e-bike is a further type of electric bicycle in which an electric drive which is present is controlled by means of a rotary grip on the handlebars of the bicycle.

The method for automatically shifting a gearshift mechanism of a bicycle, such as an electric bicycle, comprising a device according to the disclosure, may comprise the following steps:

selecting a gear speed of the gearshift mechanism for starting on a level underlying surface by means of the first input apparatus;
selecting a velocity of the bicycle at which shifting into a maximum gear speed of the gearshift mechanism takes place on a level underlying surface by means of the second input apparatus;
selecting a further velocity of the bicycle at which shifting into the maximum or optimum gear speed for this terrain inclination takes place on an underlying surface with a positive terrain inclination by means of the third input apparatus;
individualizing the shifting algorithm, stored in the at least one computing unit, on the basis of the first, second and third input values, and
detecting the current terrain inclination by means of the at least one inclination angle sensor;
detecting the current velocity by means of the at least one further sensor;
detecting the currently set gear speed of the gearshift mechanism;
determining a shifting time for shifting the gearshift mechanism into another gear speed as a function of the current terrain inclination, the current gear speed and the current velocity; and
transmitting a shifting signal for shifting the gearshift mechanism into another gear speed from the computing unit to the at least one shifting actuator on the basis of the individualized shifting algorithm.

The method according to the disclosure permits rapid and uncomplicated selection of an individual shifting strategy which is adapted to the individual rider of the bicycle and is particularly close to the optimum shifting strategy which the rider of the bicycle would select in the case of a manual setting of the gearshift mechanism. This may reduce the necessary manual interventions by the rider of the bicycle into the shifting strategy during travel and therefore may increase the riding comfort and the riding safety.

A plane may be defined in a three-dimensional coordinate system with the coordinates x, y and z in particular on the basis of the first input value E1, the second input value E2 and the third input value E3 by means of the computing unit, wherein the x coordinate corresponds to a velocity, wherein the y coordinate corresponds to a gear speed of the gearshift mechanism, and wherein the z coordinate corresponds to a terrain inclination, and wherein the at least one computing unit outputs a shifting signal for shifting the gearshift mechanism into another gear speed to the at least one shifting actuator if a current riding state, which is defined by the current velocity, a currently selected gear speed of the gearshift mechanism and the current terrain inclination is defined, is in the defined plane or approaches the defined plane.

The plane may be acquired from the three input values, wherein, in particular, a Hesse normal form of the plane equation is selected. The plane equation may be stored in the at least one computing unit as a basis for the individualized shifting strategy.

It has proven valuable for the method if a series of successive riding states are acquired and a future riding state profile is predicted from said riding states. When it is predicted that the riding state profile approaches the defined plane, the shifting signal for shifting the gearshift mechanism into another gear speed may be transmitted from the computing unit to the at least one shifting actuator. The riding comfort for the rider of the bicycle may be increased further by taking into account the current riding dynamics in this way.

When the current riding state or the predicted riding state profile approaches the defined plane from above the plane, a shifting signal for shifting the gearshift mechanism into the next lowest gear speed may be transmitted to the shifting actuator. When the current riding state or the predicted riding state profile approaches the defined plane from below the plane, a shifting signal for shifting the gearshift mechanism into the next highest gear speed may be transmitted to the shifting actuator. This permits fluid automatic shifting even in the case of riding terrain which changes to a great extent.

BRIEF DESCRIPTION OF THE DRAWINGS

FIG. 1 is a schematic view of a device for automatically shifting a gearshift mechanism of a bicycle, according to an embodiment;

FIG. 2 is an illustration of a plane, defined on the basis of three individual input values E1, E2, E3, in a three-dimensional coordinate system, according to an embodiment; and FIG. 3 shows an example of a bicycle with a device according to FIG. 1.

DETAILED DESCRIPTION

Figure 1:
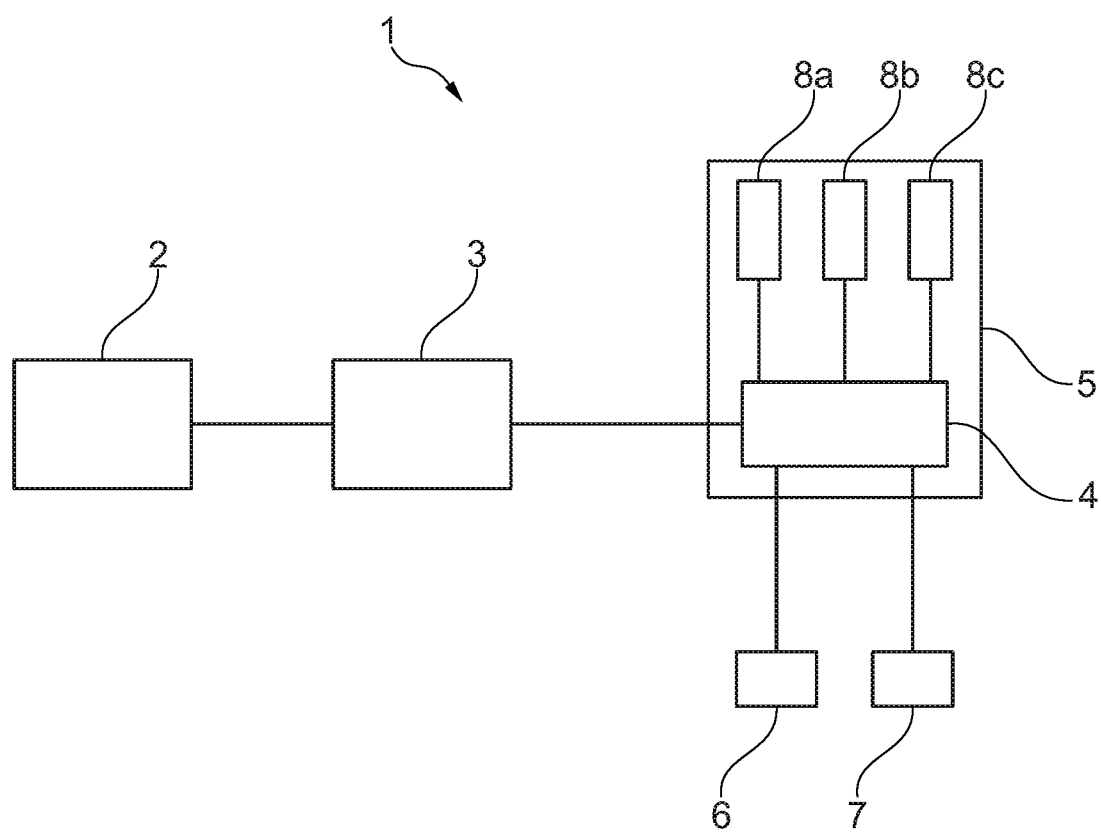
FIGS. 1 to 3 are intended to explain a device according to the disclosure and a method according to the disclosure by way of example. Therefore, in the drawings.

FIG. 1 is an example of a schematic view of a device 1 for automatically shifting a gearshift mechanism 2 of a bicycle 100 (see, e.g., FIG. 3) comprising a shifting actuator 3 for automatically activating the gearshift mechanism 2, a computing unit 4 which is connected to the shifting actuator 3, and an operator control and display unit 5 which is connected to the computing unit 4. The computing unit 4 may be arranged integrated to the operator control and display unit 5, but it can also be arranged separately therefrom and can have a data-transmitting connection to the operator control and display unit 5 in a wireless fashion or via an electrical lead. Furthermore, the device 1 may comprise an inclination angle sensor 6 for detecting a current terrain inclination ρ and a further sensor 7 for detecting a current velocity v of the bicycle 100, wherein the inclination angle sensor 6 and the further sensor 7 are connected to the computing unit 4.

The operator control and display unit 5 may make available a first input apparatus 8a for inputting a first input value E1 (see, e.g., FIG. 2) in the form of a gear speed n of the gearshift mechanism 2 for starting on a level underlying surface, e.g., in the case of a terrain inclination ρ=0%. The operator control and display unit 5 may also make available a second input apparatus 8b for inputting a second input value E2 in the form of a velocity v1 of the bicycle 100 at which shifting into a maximum gear speed n of the gearshift mechanism 2 takes place on a level underlying surface, e.g., in the case of a terrain inclination ρ=0%. The operator control and display unit 5 may make available a third input apparatus 8c for inputting a third input value E3 in the form of a further velocity v2 of the bicycle 100 at which shifting into a maximum or optimum gear speed for this terrain inclination ρ takes place on an underlying surface F (see, e.g., FIG. 3) with a positive terrain inclination ρ. A shifting algorithm which can be individualized on the basis of the first, second and third input values E1, E2, E3 may be stored in the computing unit 4.

Figure 2:
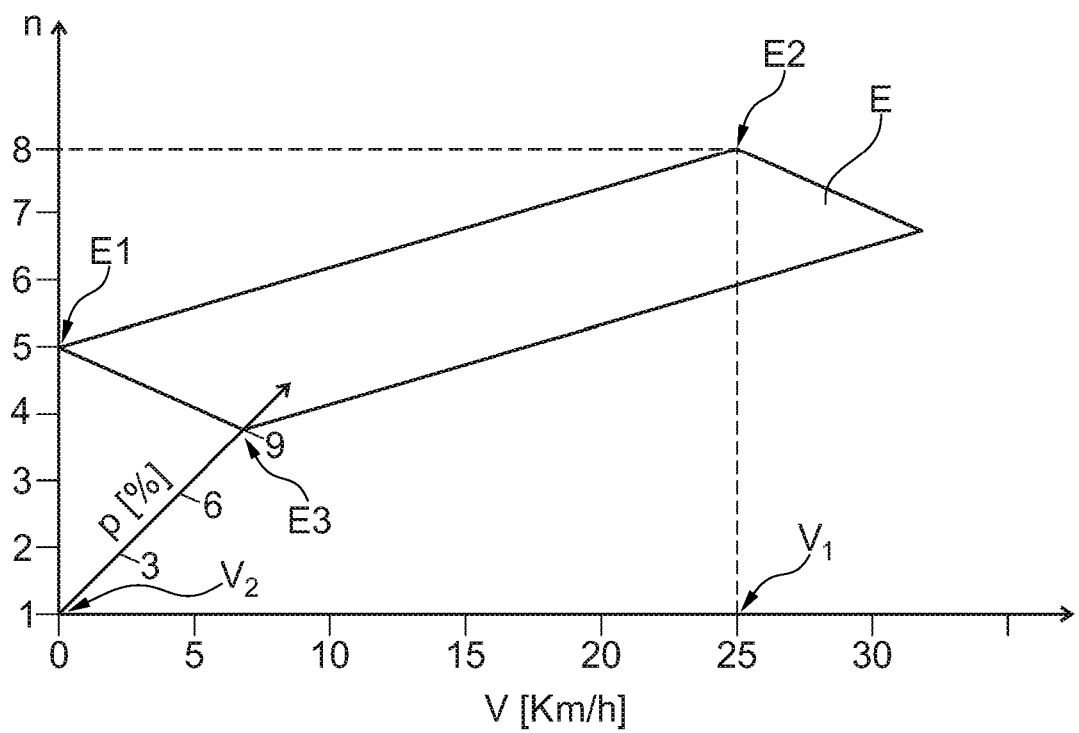

FIG. 2 is an example illustration of a plane, defined on the basis of three individual input values E1, E2, E3, in a three-dimensional coordinate system. In this context, a three-dimensional coordinate system with the coordinates x, y and z is illustrated, wherein the x coordinate corresponds to a velocity v in km/h, wherein the y coordinate corresponds to a gear speed n of the gearshift mechanism 2 (see, e.g., FIG. 1), and wherein the z coordinate corresponds to a terrain inclination ρ in %. Here, a gearshift mechanism 2 with n=8 gear speeds may be present. The first input value E1 has been specified here by the rider of the bicycle 2 in the form of a gear speed n=5 of the gearshift mechanism 2 for starting on a level underlying surface with a terrain inclination ρ=0%. The second input value E2 has been specified here by the rider of the bicycle in the form of a velocity v1=25 km/h of the bicycle at which shifting into a maximum gear speed n=8 of the gearshift mechanism 2 is to take place on a level underlying surface with a terrain inclination ρ=0%. The third input value E3 has been specified here by the rider of the bicycle in the form of a further velocity v2=0 km/h of the bicycle at which shifting into a maximum or optimum gear speed n=1 of the gearshift mechanism 2 for the terrain inclination is to take place on an underlying surface with a positive terrain inclination here of ρ=9%. The "maximum" gear speed is logically a different gear speed n of the gearshift mechanism 2 in the plane E than the maximum or optimum gear speed in the case of a positive terrain inclination or positive gradient of, for example, 9%.

The three input values E1, E2, E3 define three points in the three-dimensional coordinate system which span the plane E. The shifting algorithm which may be stored in the computing unit 4 is individualized on the basis of the defined plane E. The computing unit 4 is configured to output a shifting signal for shifting the gearshift mechanism 2 into another gear speed n to the at least one shifting actuator 3 if a current riding state, which is determined by the current velocity v, a currently selected gear speed n of the gearshift mechanism 2 and the current terrain inclination ρ, is in the defined plane E or approaches the defined plane E. In one embodiment, a series of successive travel states are acquired and a future riding state profile is predicted from said travel states. When it is predicted that the riding state profile will approach the defined plane E, a shifting signal for shifting the gearshift mechanism 2 into another gear speed n is transmitted from the at least one computing unit 4 to the at least one shifting actuator 3. When the current riding state or the predicted riding state profile approaches the defined plane E from above the plane E, a shifting signal for shifting the gearshift mechanism 2 into a next lowest gear speed n−1 is transmitted to the shifting actuator 3. When the current riding state or the predicted riding state profile approaches the defined plane E from below the plane E, a shifting signal for shifting the gearshift mechanism 2 into a next highest gear speed n+1 is transmitted to the shifting actuator 3.

Figure 3:
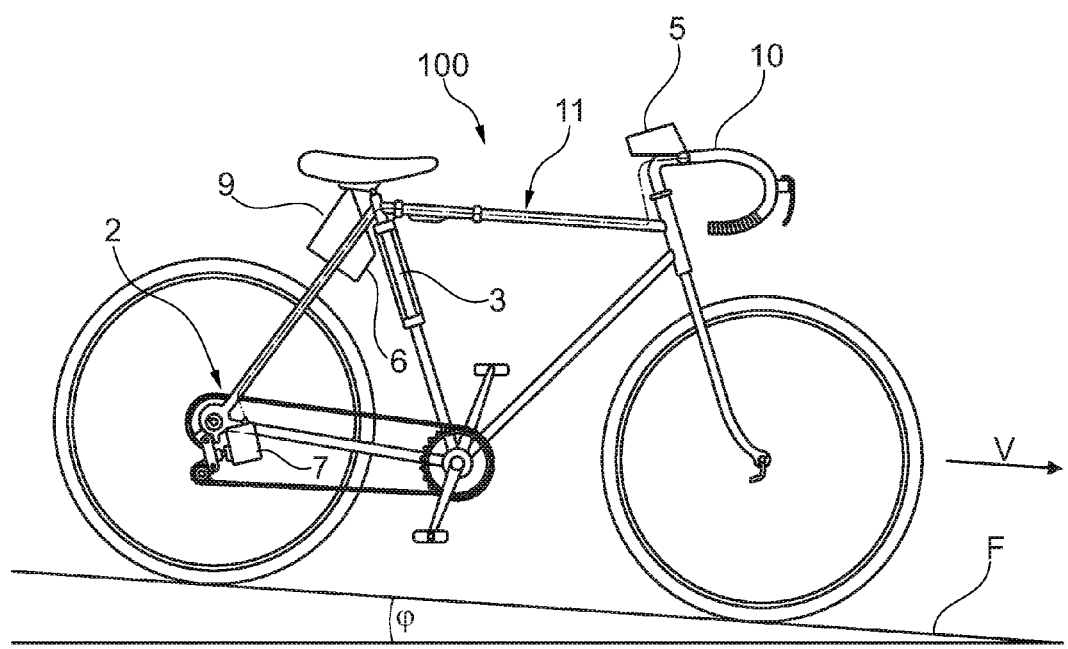

FIG. 3 shows an example of a bicycle 100 with a device according to FIG. 1. The same reference signs as in FIG. 1 characterize the same elements. The bicycle 100 is on an underlying surface F which has a terrain inclination ρ, here a negative terrain inclination or a negative gradient. The operator control and display unit 5 of the device is arranged here on the handlebars 10 of the bicycle 100, but it can also be arranged on the frame 11 (or other location) of the bicycle 100, wherein an arrangement in the field of vision and operator control range of the rider of the bicycle is preferred. The bicycle 100 may have an energy supply apparatus 9 which serves to supply the shifting actuator 3 and can also serve to supply electricity to the operator control and display unit 5 and to the computing unit 4, not illustrated separately here, (see, e.g., FIG. 1). Alternatively, the operator control and display unit 5 and the computing unit 4 can also be supplied by means of a battery of the operator control and display unit 5.

The embodiments of the device according to the disclosure and of the method according to the disclosure which are illustrated in FIGS. 1 to 3 are selected merely by way of example and can be changed within wide limits without departing from the subject matter of the disclosure. It is therefore possible for a plurality of shifting actuators and/or a plurality of computing units, and if appropriate also a plurality of operator control and display units, to be present.

LIST OF REFERENCE SYMBOLS

1 Device
2 Gearshift mechanism
3 Shifting actuator
4 Computing unit
5 Operator control and display unit
6 Inclination angle sensor
7 Further sensor
8a First input apparatus
8b Second input apparatus
8c Third input apparatus
9 Energy supply apparatus
10 Handlebars
11 Frame
100 Bicycle
E1 First input value
E2 Second input value
E3 Third input value
E Plane
F Underlying surface
n Gear speed of the gearshift mechanism
v Velocity
ρ Terrain inclination

The invention claimed is:

1. A device for automatically shifting a gearshift mechanism of an electric bicycle, comprising:
at least one shifting actuator configured to automatically activate the gearshift mechanism;
at least one computing unit connected to the at least one shifting actuator, an operator control and display unit connected to the at least one computing unit, at least one inclination angle sensor for detecting a current terrain inclination (ρ), and at least one further sensor for detecting a current velocity (v) of the bicycle, wherein the at least one inclination angle sensor and the at least one further sensor are connected to the at least one computing unit;
wherein the operator control and display unit:
makes available a first input apparatus for inputting a first input value (E1) in the form of a gear speed (n) of the gearshift mechanism for starting on a level underlying surface (F);
makes available a second input apparatus for inputting a second input value (E2) in the form of a velocity (v) of the bicycle at which shifting into a maximum gear speed (n) of the gearshift mechanism takes place on a level underlying surface (F);
has a third input apparatus for inputting a third input value (E3) in the form of a further velocity (v) of the bicycle at which shifting into a maximum gear speed (n) for this terrain inclination takes place on an underlying surface (F) with a positive terrain inclination (ρ); and
wherein a shifting algorithm individualized on the basis of the first, second and third input values (E1, E2, E3) is stored in the at least one computing unit.

2. The device as claimed in claim 1, wherein at least the second input apparatus and/or at least the third input apparatus is formed by a slide controller.

3. The device as claimed in claim 2, wherein the operator control and display unit makes available a graphic simulation of the slide controller.

4. The device as claimed in claim 1, wherein the at least one computing unit is configured to define, with the aid of the first input value (E1), the second input value (E2) and the third input value (E3), a plane (E) in a three-dimensional coordinate system with the coordinates x, y and z, wherein the x coordinate corresponds to a velocity (v), wherein the y coordinate corresponds to a gear speed (n) of the gearshift mechanism, and wherein the z coordinate corresponds to a terrain inclination (ρ), in that the shifting algorithm which is stored in the computing unit can be individualized on the basis of the defined plane (E), and in that the at least one computing unit is configured to output a shifting signal for shifting the gearshift mechanism into another gear speed (n) to the at least one shifting actuator if a current riding state, which is determined by the current velocity (v), a currently selected gear speed (n) of the gearshift mechanism and the current terrain inclination (ρ), is in the defined plane (E) or approaches the defined plane (E).

5. A method for automatically shifting a gearshift mechanism of an electric bicycle as claimed in claim 1, the method comprising the following steps:
selecting a gear speed (n) of the gearshift mechanism for starting on a level underlying surface (F) via the first input apparatus;
selecting a velocity (v) of the bicycle at which shifting into a maximum gear speed (n) of the gearshift mechanism takes place on a level underlying surface (F) via the second input apparatus;
selecting a further velocity (v) of the bicycle at which shifting into the maximum gear speed (n) for this terrain inclination (ρ) takes place on an underlying surface (F) with a positive terrain inclination (ρ) via the third input apparatus;
detecting the current terrain inclination (ρ) via the at least one inclination angle sensor;
detecting the current velocity (v) via the at least one further sensor;
detecting the currently set gear speed (n) of the gearshift mechanism;
determining a shifting time for shifting the gearshift mechanism into another gear speed (n) as a function of the current terrain inclination (ρ), the current gear speed (n) and the current velocity (v),
individualizing the shifting algorithm, stored in the at least one computing unit, on the basis of the first, second and third input values (E1, E2, E2), and
transmitting a shifting signal for shifting the gearshift mechanism into another gear speed (n) from the computing unit to the at least one shifting actuator on the basis of the individualized shifting algorithm.

6. The method as claimed in claim 5, wherein a plane (E) is defined in a three-dimensional coordinate system with the coordinates x, y and z on the basis of the first input value (E1), the second input value (E2) and the third input value (E3) via the computing unit, wherein the x coordinate corresponds to a velocity (v), wherein the y coordinate corresponds to a gear speed (n) of the gearshift mechanism, and wherein the z coordinate corresponds to a terrain inclination (ρ), and wherein the at least one computing unit outputs a shifting signal for shifting the gearshift mechanism into another gear speed (n) to the at least one shifting actuator if a current riding state, which is defined by the current velocity (v), a currently selected gear speed (n) of the gearshift mechanism and the current terrain inclination (ρ), is in the defined plane (E) or approaches the defined plane (E).

7. The method as claimed in claim 6, wherein a series of successive travel states are acquired and a future travel state profile is predicted from said travel states and in that when it is predicted that the riding state profile approaches the defined plane (E), the shifting signal for shifting the gearshift mechanism into another gear speed (n) is transmitted from the at least one computing unit to the at least one shifting actuator.

8. The method as claimed in claim 7, wherein when the current riding state or the predicted riding state profile approaches the defined plane (E) from above the plane (E), a shifting signal for shifting the gearshift mechanism into a next lowest gear speed (n) is transmitted to the shifting actuator.

9. The method as claimed in claim 7, wherein when the current riding state or the predicted riding state profile approaches the defined plane (E) from below the plane (E), a shifting signal for shifting the gearshift mechanism into a next highest gear speed (n) is transmitted to the shifting actuator.

10. The use of a device as claimed in claim 1 for automatically shifting a gearshift mechanism of an electric bicycle, wherein the electric bicycle is a pedelec or an e-bike.

* * * * *